US007959128B2

(12) United States Patent
Hoppe et al.

(10) Patent No.: US 7,959,128 B2
(45) Date of Patent: Jun. 14, 2011

(54) HYDRAULIC DIRECTIONAL VALVE

(75) Inventors: Jens Hoppe, Erlangen (DE); Andreas Rohr, Heroldsbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 332 days.

(21) Appl. No.: 12/089,675

(22) PCT Filed: Sep. 7, 2006

(86) PCT No.: PCT/EP2006/066149

§ 371 (c)(1),
(2), (4) Date: Apr. 9, 2008

(87) PCT Pub. No.: WO2007/042361

PCT Pub. Date: Apr. 19, 2007

(65) Prior Publication Data

US 2008/0245983 A1 Oct. 9, 2008

(30) Foreign Application Priority Data

Oct. 12, 2005 (DE) ........................ 10 2005 048 732

(51) Int. Cl.
*F16K 31/02* (2006.01)

(52) U.S. Cl. .............................. 251/129.07; 251/129.15

(58) Field of Classification Search ............. 251/129.07, 251/129.15, 129.21
See application file for complete search history.

(56) References Cited

U.S. PATENT DOCUMENTS

| | | | | |
|---|---|---|---|---|
| 5,467,963 | A * | 11/1995 | Crofts et al. | 251/129.18 |
| 5,483,930 | A * | 1/1996 | Moriya et al. | 123/90.17 |
| 6,062,823 | A * | 5/2000 | Kawaguchi et al. | 417/222.2 |
| 6,289,921 | B1 * | 9/2001 | Neuhaus et al. | 137/454.5 |
| 6,315,268 | B1 * | 11/2001 | Cornea et al. | 251/129.15 |
| 6,498,416 | B1 * | 12/2002 | Oishi et al. | 310/214 |
| 6,722,627 | B2 * | 4/2004 | Murao et al. | 251/129.15 |
| 2005/0081810 | A1 | 4/2005 | Isobe et al. | |

FOREIGN PATENT DOCUMENTS

| | | |
|---|---|---|
| DE | 3006644 | 9/1981 |
| DE | 9107436.3 | 10/1991 |
| DE | 4104219 | 8/1992 |
| DE | 19817319 | 10/1999 |
| DE | 10211467 | 9/2003 |
| DE | 10238840 | 3/2004 |
| DE | 10355502 | 6/2005 |
| JP | 2005251915 | 9/2005 |

* cited by examiner

*Primary Examiner* — John K Fristoe, Jr.
(74) *Attorney, Agent, or Firm* — Volpe and Koenig, PC

(57) ABSTRACT

An electromagnetic actuating unit (10) of a hydraulic directional control valve (9) is provided having an armature (18) which is arranged such that it can be axially displaced within an armature space (30), and includes a pole core (29) which is arranged in a receptacle (27*a*) and delimits the armature space (30) in a movement direction of the armature (18). Constructions are provided in order to avoid deposits on a guide surface of the armature (18), as a result of which the dynamics and the response behavior of the actuating unit (10) are increased and hysteresis effects and the risk of a malfunction of the actuating unit are minimized.

10 Claims, 3 Drawing Sheets

HYDRAULIC DIRECTIONAL VALVE

BACKGROUND

The invention relates to an electromagnetic actuating unit of a hydraulic directional valve with an armature, which is arranged such that it can be axially displaced within an armature space, and a pole core, which is arranged in a receptacle and which delimits the armature space in a movement direction of the armature.

Such directional valves are used in internal combustion engines, for example, for controlling hydraulic camshaft adjusters. The directional valves are made from an electromagnetic actuating unit and a valve section. The valve section represents the hydraulic section of the directional valve, wherein at least one feed connection, at least one work connection, and a tank connection are formed on this section. By use of the electromagnetic actuating unit, certain connections of the valve section can be connected to each other hydraulically and thus the pressure medium flows can be controlled.

Such directional valves can have a one-part construction, wherein the electromagnetic actuating unit is connected to the valve section that is fixed in place. In these cases, the directional valve is positioned in a receptacle formed, for example, on a cylinder head or on a cylinder head cover and connected via pressure medium lines to the pressure chambers of the camshaft adjuster.

In another embodiment, the electromagnetic actuating unit and the valve section are constructed as separate components, wherein the valve section is arranged radially within an inner rotor of the camshaft adjuster. In this way it is conceivable, for example, to arrange the valve section within a receptacle, which is constructed on the inner rotor, a camshaft, or an extension of the camshaft. In this case, the valve section is arranged coaxial to the camshaft and the inner rotor and rotates together with these parts about the common rotational axis.

In the axial direction to the valve section, the electromagnetic actuating unit is arranged, wherein this unit is fixed in place, for example, to a timing case or the like. The electromagnetic actuating unit controls the axial position of a push rod, which in turn controls the axial position of a control piston of the valve section.

For the use of a directional valve for controlling a camshaft adjuster, the directional valve is normally constructed as a 4/3 or 4/2 proportional directional valve. Such a proportional valve is known, for example, from DE 102 11 467 A1. In this case, the electromagnetic actuating unit is made from a magnetic yoke (pole core), a coil, a housing, an armature, and a connection element, which holds an electrical plug connection used for supplying power to the coil.

The coil and the pole core are arranged coaxial to each other within the housing of the electromagnetic actuating unit. Within the coil, an armature space is formed, which is delimited in the radial direction by the extrusion coating of the coil and in the axial direction on one end by the housing and on the other end by the pole core held in the armature space. Within the armature space there is an armature, which is displaceable in the axial direction and on which a push rod is mounted, which engages through an opening of the pole core and is supported in this opening in the radial direction. The armature, the housing, and the pole core form a flow path for the magnetic flux lines, which are generated by exciting the coil.

The valve section is comprised of a valve housing and a control piston arranged so that it can be axially displaced. The valve housing is constructed as a central screw, which is arranged within an inner rotor of a camshaft adjuster and which locks these in rotation with a camshaft. On the inner rotor, an outer rotor is mounted rotatably, which is in driven connection with a crankshaft in the shown embodiment via a chain drive.

Several pressure medium connections, which are used as feed, discharge, and work connections, are formed on the outer casing surface of the valve housing. The work connections communicate with pressure chambers working against each other and formed within the camshaft adjuster.

In the interior of the valve housing, a control piston is arranged so that it can be axially displaced, wherein the outer diameter of the control piston is adapted to the inner diameter of the valve housing. Ring grooves, via which adjacent pressure medium connections can be connected to each other, are formed on the outer casing surface of the control piston.

By exciting the coil, the armature is forced in the direction of the pole core, with this motion being transmitted to the control piston by means of a push rod attached to the armature. This control piston is now moved in the axial direction against a spring supported on the valve housing, by means of which the pressure medium flow from the feed connection to one of the work connections and from the other work connection to the discharge connection is controlled. In this way, pressure medium is fed to or discharged from the pressure chambers of the camshaft adjuster, by which the phase position of the camshaft relative to a crankshaft can be varied.

In order to guarantee smooth axial displacement of the armature during the operation, a small amount of lubricant is to be fed to the armature space. This is achieved in such a way that a small amount of leakage of motor oil into the interior of the actuating unit is permitted.

During the service life of the actuating unit, the small circulation of lubricant into the actuating unit leads to the result that deposits, for example, of old motor oil or foreign bodies can settle on the running surface of the armature or oil sludge can collect within the actuating unit. This leads to deteriorated response behavior of the actuating unit, higher hysteresis effects, and lower dynamics and can lead up to the seizure of the armature and thus to the failure of the actuating unit and thus the camshaft adjuster.

SUMMARY

Therefore, the invention is based on the objective of avoiding these mentioned disadvantages and thus creating an electromagnetic actuating unit, which features long-term, improved response behavior and dynamics with small hysteresis effects, wherein the service life should be increased and the costs and the production expense should be reduced or at least not increased.

According to the invention, the object is met in that at least one outlet channel is provided, which communicates both with the armature space and also with the exterior of the actuating unit.

In addition, it can be provided that a push rod, which extends through an opening in the pole core and which is supported radially by the core, is connected to the armature.

An armature space of the actuating unit is surrounded in the radial direction and in the axial direction at least partially by a coil, which can be excited by a connection element. Within the armature space there is an armature, which is displaceable in the axial direction and which is mounted on the guide face adapted to the outer contours of the armature. The axial position of the armature within the armature space can be set by exciting the coil. The guide face can be formed, for example, by an armature guide sleeve, which is supported at least partially by the extrusion coating of the coil, or by the extrusion coating itself. In an axial direction of the armature, preferably in a direction facing the valve section, the armature space is delimited by a pole core. The pole core is arranged in a receptacle, which can be formed, for example, by the armature guide sleeve, the extrusion coating of the coil, or in a housing, which at least partially includes the actuating unit. The pole core can be mounted locked in rotation and in position in the receptacle, for example, by means of a press fit. The actuating unit is mounted on a surrounding construction, for example, a timing case, by means of retaining clips formed on the housing, wherein the retaining clips are arranged and constructed in such a way that the actuating unit can be mounted on the surrounding construction in only one orientation.

The movement of the armature is transmitted to a control piston of a valve section arranged axial to the actuating unit by means of a push rod connected to this armature. In this way, the push rod passes through an opening, which is formed in the pole core and in which the push rod is supported radially and guided axially.

To achieve high response dynamics and low hysteresis effects, it is provided to feed a small amount of lubricant, in the form of motor oil, to the armature space during the operation of the internal combustion engine.

According to the invention, it is proposed to form, on the actuating unit, an outlet, via which the motor oil in the armature space can be led out of the actuating unit. In this way, a circulating effect is created within the armature space. This prevents deposits, for example, old motor oil or foreign bodies, from settling on the guide surface or the armature. In addition, foreign bodies, for example, original contaminants of the internal combustion engine or abraded particles, are flushed out from the actuating unit and collection of oil sludge within the actuating unit is prevented. In this way, the armature moves in the armature space against a small resistance and there is no risk of the armature seizing. The response behavior and the dynamics of the movement of the armature remain high for a long time and hysteresis effects and the risk of failures are significantly reduced.

In one embodiment of the invention, it is provided that the outlet channel opens at a geodetically lowest position in the armature space.

Therefore, because the opening of the outflow channel in the armature space is provided at a position, at which the motor oil located in the actuating unit collects due to gravity, the actuating unit is emptied in a functionally reliable way in the especially critical phases, the operating pauses of the internal combustion engine. In these operating phases, the motor oil is not continuously circulated, because the armature does not move. Deposition effects are realized preferably in these phases. Through the completely automatic emptying of the actuating unit, this risk is overcome.

In one advantageous improvement of the invention, it is provided that the outflow channel opens into a timing case.

In the case of chain-driven camshaft adjusters, the actuating unit passes through a flange section of a timing case. To prevent motor oil discharged from the actuating unit from reaching into the engine compartment of a vehicle, it must be ensured that this is recirculated without leakage into the crankcase of the internal combustion engine. An economical solution is achieved in such a way that the outflow channel also extends through the opening of the flange section of the timing case and opens into its interior.

In one improvement of the invention, it is provided to form the outflow channel as an outflow borehole in the pole core. Alternatively, it can be provided to form the outflow channel between the pole core and a wall of the receptacle of the pole core. In this way, it can be provided that the outflow channel is formed as an axial groove on an outer casing surface of the pole core or on an inner casing surface of a wall of the receptacle. Alternatively, the pole core can be mounted with a non-positive fit within a receptacle opening of a housing, wherein the outflow channel is formed as a ring channel between the pole core and the receptacle and communicates with the exterior of the actuating unit via a recess on an inner casing surface of the receptacle opening, a recess on the outer casing surface of the pole core, or a housing opening.

The proposed embodiments represent economical or cost-neutral solutions to be realized, which do not or barely increase the production expense. During the production of the components, the outflow channel can be taken into account through slight modifications to the production tool.

In addition, it can be provided that the actuating unit controls a directional valve formed as a central valve, wherein the directional valve is arranged radially within an inner rotor of a device for variable setting of the control times of an internal combustion engine.

BRIEF DESCRIPTION OF THE DRAWINGS

Additional features of the invention emerge from the following description and from the drawings, in which embodiments of the invention are shown simplified. Shown are FIG. 1 a longitudinal section view of a camshaft adjuster mounted on a camshaft with a directional valve constructed as a central valve, FIG. 2*a* a longitudinal section view of a first embodiment of an actuating unit according to the invention.

DETAILED DESCRIPTION OF THE PREFERRED EMBODIMENTS

Figure 1:
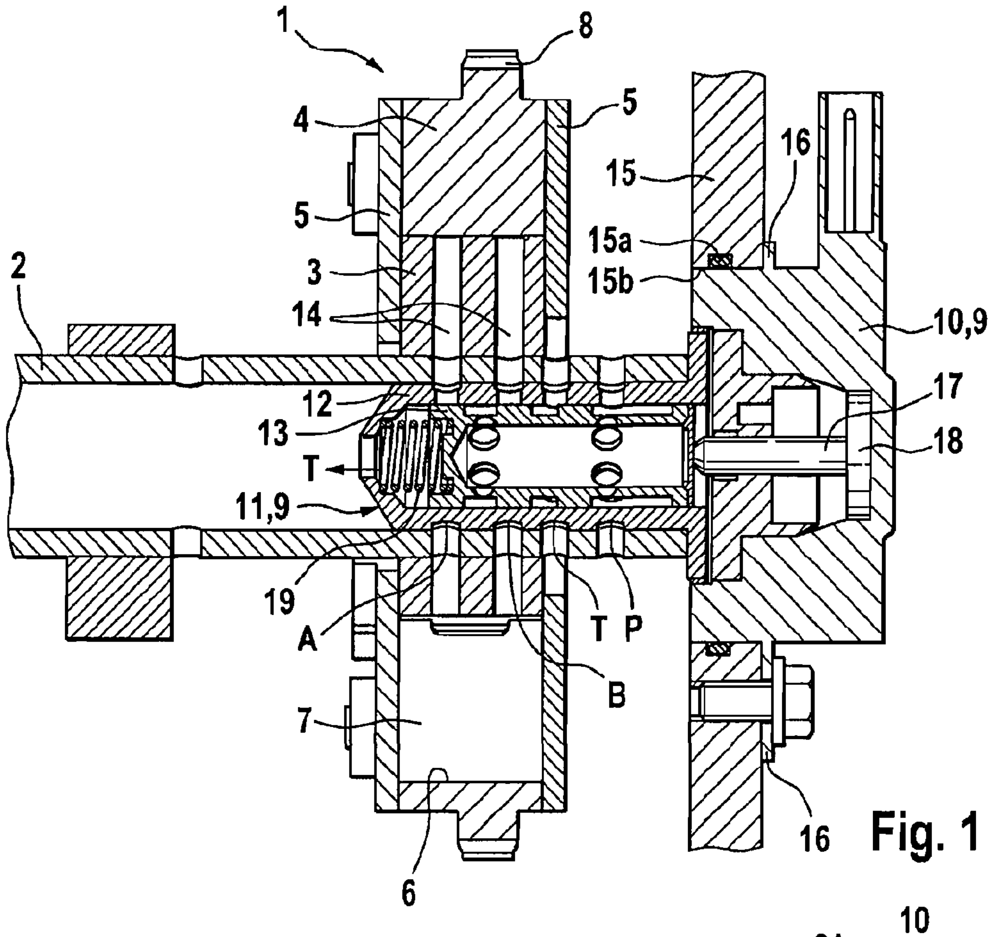

In FIG. 1, a camshaft adjuster 1 is shown, which is arranged on a drive-side end of a camshaft 2. The camshaft adjuster 1 is made from an inner rotor 3, an outer rotor 4, and two side covers 5. The inner rotor 3 is locked in rotation with the camshaft 2 and arranged coaxial to the outer rotor 4. The side covers 5 delimit the camshaft adjuster 1 in the axial direction. On an inner casing surface of the outer rotor 4, there are recesses 6, which are delimited in a pressure-tight manner by the outer rotor 4, the inner rotor 3, and the side covers 5. On an outer casing surface of the inner rotor 3 there are vanes 7, wherein each vane 7 engages in one of the recesses 6 and divides the recesses into two pressure chambers acting against each other.

Through the use of a chain wheel 8 formed on an outer casing surface of the outer rotor 4, the outer rotor 4 is in driven connection with a not-shown crankshaft. Through a hydraulic actuating device formed by the pressure chambers and the vane 7, the torque of the crankshaft transmitted to the outer rotor 4 is transmitted to the inner rotor 3 and thus to the camshaft 2. By feeding or discharging pressure medium to or from individual pressure chambers, a phase position between the outer rotor 4 and the inner rotor 3 can be set or maintained within a certain angular range. In this way, the phase position of the camshaft 2 can be set variably relative to the crankshaft within a certain window.

The formation of such camshaft adjusters 1 and their functioning have been known for a long time by someone skilled in the art and are described, for example, in DE 103 55 502 A1.

For controlling the phase position of the camshaft 2 relative to the crankshaft, a hydraulic directional valve 9 is provided, which is made from an electromagnetic actuating unit 10 and a valve section 11. The directional valve 9 is formed as a central valve, wherein the valve section 11 is arranged radially within the inner rotor 3 and coaxial to this inner rotor and can either rotate with this inner rotor about the common rotational axis or stand still.

The valve section 11 is assembled from a valve housing 12 and a control piston 13, wherein the valve section 11 is arranged within the hollow camshaft 2. The essentially hollow-cylindrical valve housing 12 has two work connections A, B, a feed connection P, and two discharge connections T. Within the valve housing 12, the control piston 13 is held so that it can be axially displaced. Through suitable positioning of the control piston 13 relative to the valve housing 12, each of the work connections A, B can be connected either to the feed connection P or to the discharge connection T. The work connections A, B are in hydraulic connection with the pressure chambers via pressure medium lines 14. Through suitable positioning of the control piston 13 within the valve housing 12, pressure medium can be fed to or discharged from selective, individual pressure chambers of the camshaft adjuster 1 and thus the phase position of the camshaft 2 can be set relative to the crankshaft.

The electromagnetic actuating unit 10 to be explained in more detail is arranged in the axial direction relative to the camshaft 2 and the valve section 11. In the shown embodiment, the actuating unit 10 passes through a flange section 15*b* of a timing case 15, with which this is screwed locked in position and in rotation by retaining clips 16. Here, several retaining clips 16 are provided, which are arranged in such a way that the actuating unit 10 can be mounted only in one defined orientation relative to the timing case 15.

The outer diameter of a housing 26 surrounding the actuating unit 10 is adapted to the inner diameter of the opening of the flange section 15*b*, wherein a first sealing element 16*a* is arranged at the sealing position between the components.

Through the use of a push rod 17, the axial movement of an armature 18 can be transmitted to the control piston 13 and this piston can be shifted in the axial direction against the force of a spring element 19. In this way, the hydraulic connections between the work connections A, B, the feed connection P, and the tank connections T can be controlled selectively and thus the phase position of the camshaft 2 relative to the crankshaft can be influenced.

Figure 2A:
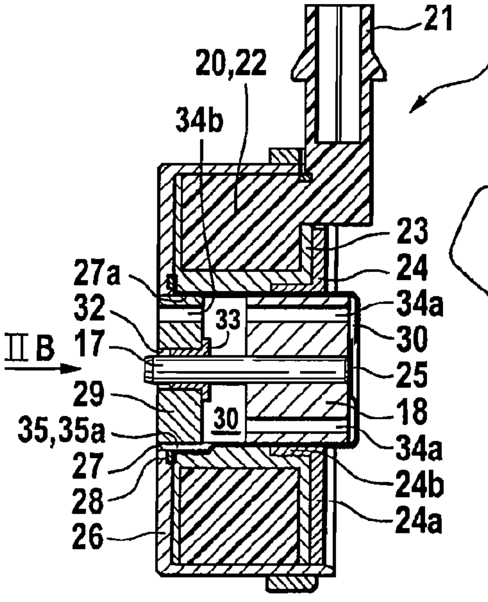
FIG. 2*b* is a top view of the actuating unit according to the invention from FIG. 2*a* along the arrow IIB.

With reference to FIG. 2*a*, below the structure of the electromagnetic actuating unit 10 and its functioning will be explained.

The electromagnetic actuating unit 10 has a coil body 20 and a connection element 21 formed integrally with this coil body. The coil body 20 carries a coil 22 made from several windings of a suitable wire and is surrounded at least partially by an extrusion coating 23 made from non-magnetizable material. On the side of the coil body 20 facing away from the camshaft, there is a magnetic yoke 24, which has, in the shown embodiment, a disk-like and a sleeve-like section 24*a*, 24*b*. The sleeve-like section 24*b* engages in a hollow space radially within the extrusion coating 23 of the coil 22, wherein its outer diameter is adapted to the inner diameter of the extrusion coating 23. The disk-like section 24*a* contacts the extrusion coating 23 in the axial direction and thus defines the axial position of the magnetic yoke 24. Alternatively, it is also conceivable to integrate the sleeve-like section 24*b* into the extrusion coating during the production of the extrusion coating 23.

Radially within the sleeve-like section 24*b* and the extrusion coating 23 there is a pot-shaped armature guide sleeve 25, whose open end faces the camshaft 2 and which extends in the axial direction past the coil body 20 and the extrusion coating 23. The open end of the armature guide sleeve 25 extends outward with a ring shape.

The coil body 20 is further arranged in a pot-shaped housing 26, in whose base there is a receptacle opening 27. The open end of the armature guide sleeve 25 extends in the radial direction between the base of the housing 26 and the extrusion coating 23, wherein a second sealing element 28 is provided, which seals a sealing position between the armature guide sleeve 25 and the housing 26.

The receptacle opening 27 is part of a receptacle 27*a*, in which a pole core 29 is held. In the shown embodiment, the pole core 29 is mounted on the housing 26 via a press fit with the receptacle opening 27 and projects in the axial direction into the armature guide sleeve 25.

The armature guide sleeve 25 and the pole core 29 delimit an armature space 30, in which an axially displaceable armature 18 is arranged. The push rod 17 connected to the armature 18 extends through an opening 32 formed on the pole core 29, wherein an end of the push rod 17 contacts the control piston 13 in the assembled state of the actuating unit 10. Within the opening 32, as shown in FIG. 2*a*, a sliding sleeve 33 can be provided, in order to minimize friction losses at this position.

During the operation of the internal combustion engine, a control device controls the excitation of the actuating unit 10, by which a magnetic field is generated within the actuating unit 10. The pole core 29, the housing 26, the magnetic yoke 24, and the armature 18 are here used as a flow path, which is completed by an air gap between the armature 18 and the pole core 29. Here, a force in the direction of the pole core 29 acts on the armature 18, which is dependent on the magnitude of the excitation of the coil 22. By balancing out the magnetic force, which acts on the armature 18, and the spring force, which acts on the control piston 13, the armature 18 and thus the control piston 13 can be positioned in any arbitrary position between two extreme positions.

Both in the pole core 29 and also in the armature 18, there are axial boreholes 34*a*, 34*b*. During a displacement of the armature 18 in the armature space 30, the pressure between the spaces in front of and behind the armature 18 is balanced by the pressure-equalization boreholes 34*a* in the armature 18. The armature space 30 is supplied with leakage oil in a non-pressurized state via the leakage boreholes 34*b* in the pole core 29. Through this feeding of lubricant in the armature space 30, the friction between the armature 18 and the armature guide sleeve 25 is reduced and thus the response time and the hysteresis of the actuating unit 10 are minimized.

If the lubricant in the armature space 30 is not completely replaced, there is the risk that deposits contained in the lubricant will settle on the armature support surfaces or that oil sludge will collect in the actuating unit 10. These foreign bodies could lead to the result that the response behavior of the actuating unit 10 becomes worse, up to the seizure of the armature 18 in the armature guide sleeve 25 and thus to the functional failure of the directional valve 9.

Figure 2B:
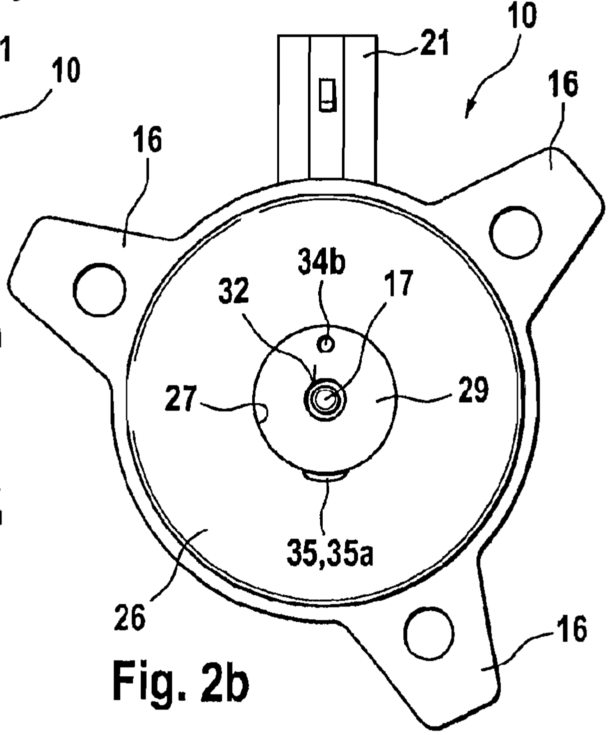

To guarantee constant discharge of the lubricant from the actuating unit 10, in the embodiment shown in FIGS. 2*a* and 2*b*, an outlet channel 35 in the form of an axial groove 35*a* is formed at the geodetically lowest position, i.e., at the position, at which the lubricant collects due to gravity, in the armature guide sleeve 25. Alternatively, the axial groove 35*a* can be formed at an outer casing surface of the pole core 29, wherein this is provided, in turn, at the geodetically lowest point of the armature guide sleeve 25. The axial groove 35*a* connects the armature space 30 to the outside of the actuating unit 10.

Lubricant coming into the actuating unit 10 collects, primarily during the operating pauses of the internal combustion engine, at the position, at which the axial groove 35*a* opens into the armature space 30, by which this can be recirculated into the timing case 15. Advantageously, either the armature guide sleeve 25 or the armature 18 is provided with axial indentations or bulging sections, so that motor oil behind the armature 18 can be led to the axial groove 35*a*. Therefore, oil motor oil, oil sludge, and foreign bodies can be discharged from the actuating unit 10, by which the response behavior and the dynamics of the actuating unit 10 can be kept for a long time at a high level, hysteresis effects can be minimized, and functional reliability can be increased.

Because the lubricant can be discharged completely from the actuating unit 10 during the operating pauses of the internal combustion engine, advantageously the armature 18 or the armature guide sleeve 25 is provided with a sliding layer, which provides an emergency running property of the armature 18 into the armature guide sleeve 25, in order to prevent wear at this position.

Figure 3A:
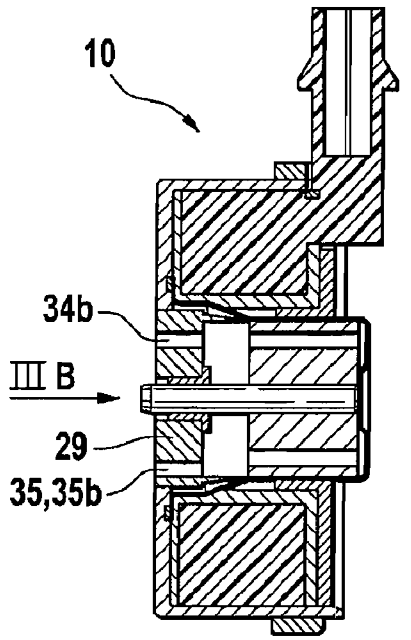
FIG. 3*a* is a longitudinal section view of another embodiment of an actuating unit according to the invention.
Figure 3B:
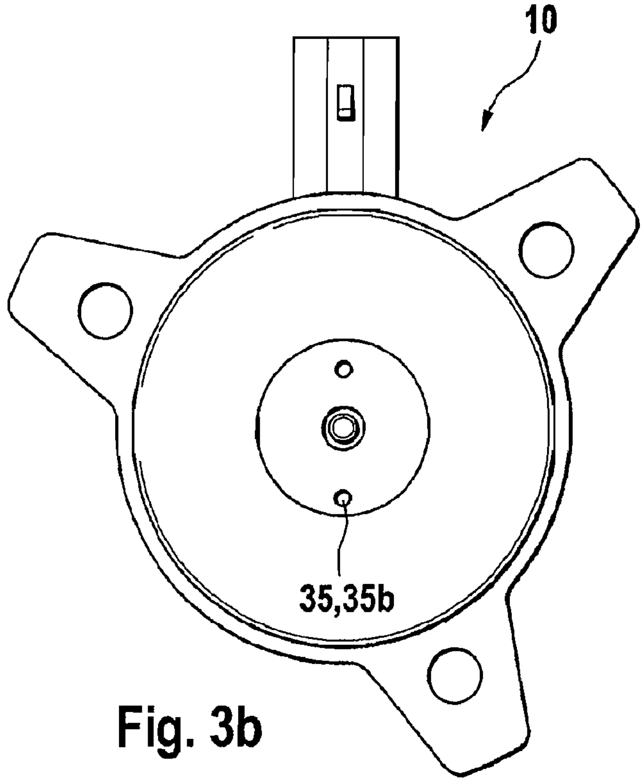
FIG. 3*b* is a top view on the actuating unit according to the invention from FIG. 3*a* along the arrow IIIB.

FIGS. 3*a* and 3*b* show another embodiment of an actuating unit 10 according to the invention, which is constructed similar to the actuating unit 10 shown in FIGS. 2*a* and 2*b*. In contrast, in this embodiment a part of the guide surface of the armature 18 is formed by the pole core 29. The outflow channel 35 is constructed in the form of an outlet borehole 35*b*, which is formed on the pole core 29 and which opens on one side into the armature space at the geodetically lowest position of the armature space 30 and on the other end opens into the timing case 15.

Figure 4A:
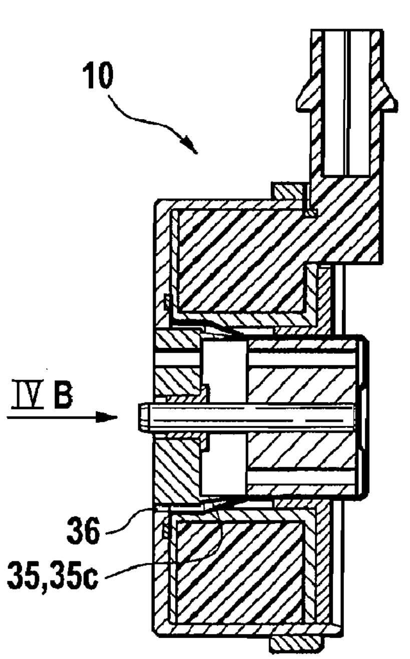
FIG. 4*a* is longitudinal section view of another embodiment of an actuating unit according to the invention.
Figure 4B:
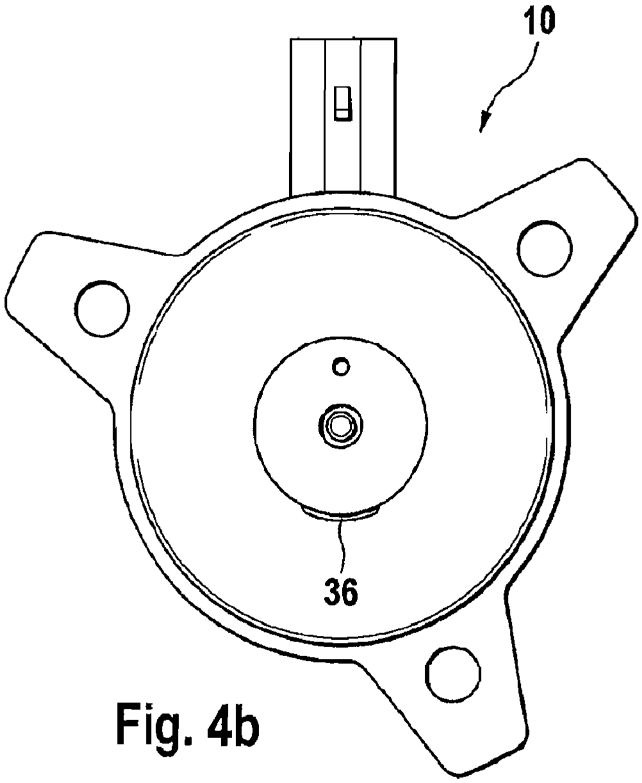
FIG. 4*b* is a top view of the actuating unit according to the invention from FIG. 4*a* along the arrow IVB.

In another embodiment according to the invention, which is represented in FIGS. 4*a* and 4*b*, a part of the guide surface of the armature 18 is formed by an axially extending section of the pole core 29. The inner diameter of the section of the armature guide sleeve 25, which contacts the base of the housing 26, has a slightly larger construction than the outer diameter of the pole core 29. In this way, an outlet channel 35 is constructed, which is formed as a ring channel 35*c* and which communicates via an annular opening with the interior of the armature guide sleeve 25, especially at the geodetically lowest position of the armature space 30. The diameter of the ring channel 35*c* constantly increases along its axial extent, starting from the annular opening, up to a maximum value. The ring channel 35*c* can communicate with the exterior of the actuating unit 10 via a recess 36 on the inner casing surface of the receptacle opening 27 of the housing 26. Alternatively, the ring channel 35*c* can communicate with the exterior of the actuating unit 10 via a recess 36 on the outer casing surface of the pole core 29. In both cases, the recess 36 is arranged, in turn, at the geodetically lowest point of the ring channel 35*c*.

Figure 5A:
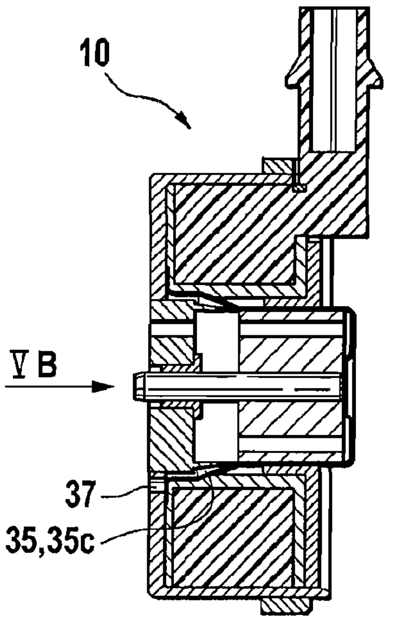
FIG. 5*a* is a longitudinal section view of another embodiment of an actuating unit according to the invention.
Figure 5B:
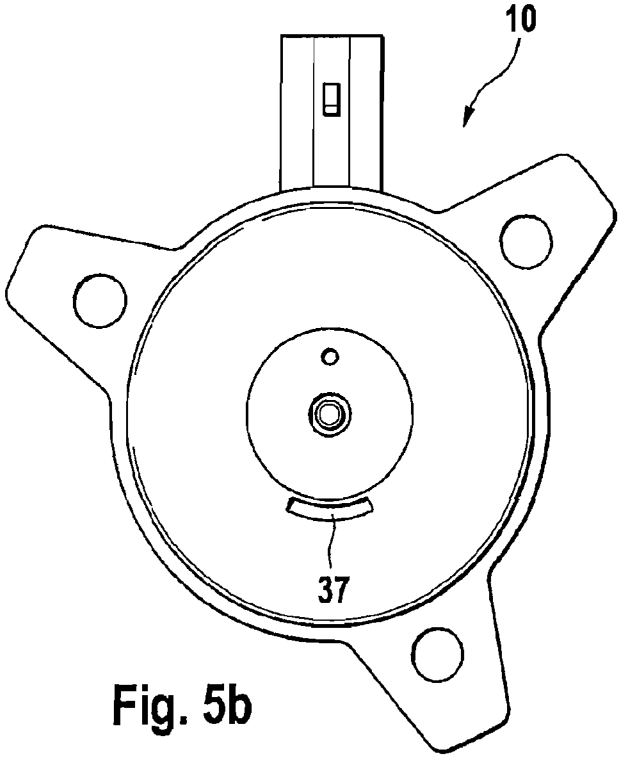
FIG. 5*b* is a top view of the actuating unit according to the invention from FIG. 5*a* along the arrow VB.

FIGS. 5*a* and 5*b* show an alternative embodiment to that shown in FIGS. 4*a* and 4*b*, in which the ring channel 35*c* communicates with the exterior of the actuating unit 10 via a housing opening 37, which is constructed in the base of the housing 26. The housing opening 37 is constructed, in turn, at the geodetically lowest point of the ring channel 35*c*.

Figure 6A:
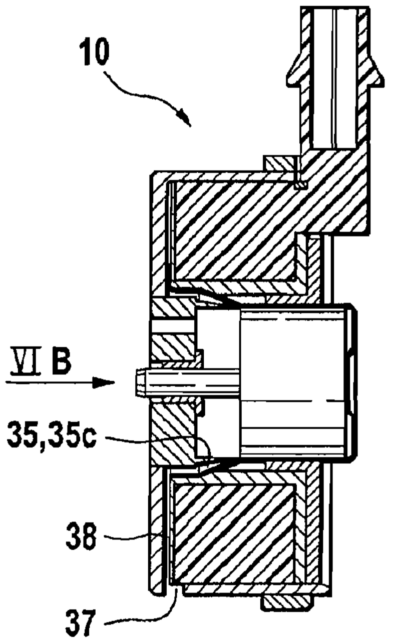
FIG. 6*a* is a longitudinal section view of another embodiment of an actuating unit according to the invention.
Figure 6B:
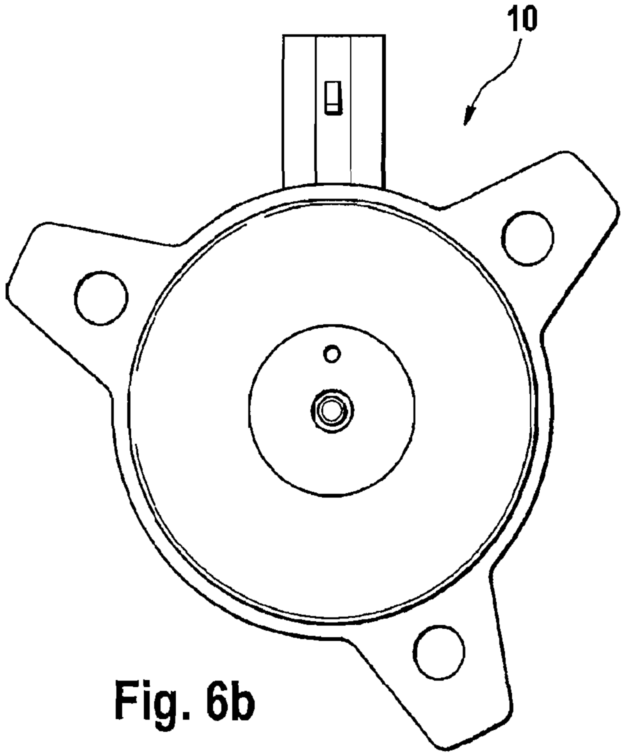
FIG. 6*b* is a top view of the actuating unit according to the invention from FIG. 6*a* along the arrow VIB.

FIGS. 6*a* and 6*b* show another embodiment of an actuating unit 10 according to the invention, in which a ring channel 35*c* is formed between the pole core 29 and the armature guide sleeve 25. The pressure medium is led to a housing opening 37 via this ring channel. In this case, the housing opening 37 is constructed on the cylindrical section of the housing 26, wherein a radial channel 38 is formed, which communicates both with the ring channel 35*c* and also with the housing opening 37, between the base of the housing 26 and the extrusion coating 23. The channel 38 opens at the geodetically lowest point of the ring channel 35*c* into this channel and the housing opening 37 is arranged underneath this opening region.

All of the embodiments have in common that a discharge channel 35 is provided, which opens at the geodetically lowest point into the armature space 30 and connects this space to the outside of the actuating unit 10, preferably to the interior of a timing case 15. Lubricant coming into the armature space 30 is not led continuously, primarily also during the operating pauses of the internal combustion engine, back into the timing case 15, by which the risk of deposits, for example, old motor oil or foreign bodies within the armature guide sleeve 25 is overcome and thus the functional reliability of the actuating unit 10 is guaranteed.

REFERENCE SYMBOLS

1 Camshaft adjuster
2 Camshaft
3 Inner rotor
4 Outer rotor
5 Side cover
6 Recess
7 Vane
8 Chain wheel
9 Directional valve
10 Actuating unit
11 Valve section
12 Valve housing
13 Control piston
14 Pressure medium line
15 Timing case
15*a* First sealing element
15*b* Flange section
16 Retaining clip
17 Push rod
18 Armature
19 Spring element
20 Coil body
21 Connection element
22 Coil
23 Extrusion coating
24 Magnetic yoke
24*a* Disk-like section
24*b* Sleeve-like section
25 Armature guide sleeve
26 Housing
27 Receptacle opening

27*a* Receptacle
28 Second sealing element
29 Pole core
30 Armature space
32 Opening
33 Sliding sleeve
34*a* Pressure-equalization borehole
34*b* Leakage borehole
35 Outflow channel
35*a* Axial groove
35*b* Outflow borehole
35*c* Ring channel
36 Recess
37 Housing opening
38 Channel
A Work connection
B Work connection
P Feed connection
T Discharge connection

The invention claimed is:

1. Electromagnetic actuating unit of a hydraulic directional valve comprising:

an armature, which is arranged within an armature space so that it can be axially displaced, a pole core, which is arranged in a receptacle and which delimits the armature space in a movement direction of the armature, at least one inlet channel that extends directly between the armature space and an outside of the actuating unit, a lubricant being fed into the armature space through the at least one inlet channel, and at least one outflow channel, separate from the at least one inlet channel, that extends directly between the armature space and the outside of the actuating unit and communicates with the armature space and the outside of the actuating unit during normal operation of the actuating unit, the lubricant being discharged from the armature space through the at least one outflow channel.

2. Electromagnetic actuating unit according to claim 1, wherein a push rod extends through an opening in the pole core and which is supported radially by the opening, is connected to the armature.

3. Electromagnetic actuating unit according to claim 1, wherein the at least one outflow channel opens into the armature space at a geodetically lowest position.

4. Electromagnetic actuating unit according to claim 1, wherein the outflow channel opens into a timing case.

5. Electromagnetic actuating unit according to claim 1, wherein the outflow channel is constructed as an outflow borehole in the pole core.

6. Electromagnetic actuating unit according to claim 1, wherein the outflow channel is constructed between the pole core and a wall of the receptacle of the pole core.

7. Electromagnetic actuating unit according to claim 6, wherein the outflow channel is constructed as an axial groove on an outer casing surface of the pole core.

8. Electromagnetic actuating unit according to claim 6, wherein the outflow channel is constructed as an axial groove on an inner casing surface of the wall of the receptacle.

9. Electromagnetic actuating unit according to claim 6, wherein the pole core is mounted with a non-positive fit within a receptacle opening of a housing, the outflow channel is constructed as a ring channel between the pole core and the receptacle and communicates with the outside of the actuating unit via a recess on an inner casing surface of the receptacle opening, the recess on the outer casing surface of the pole core, or a housing opening.

10. Electromagnetic actuating unit according to claim 1, wherein the actuating unit controls a directional valve formed as a central valve, the directional valve is arranged radially within an inner rotor of a device for the variable setting of control times of an internal combustion engine.

* * * * *